Figure 2:
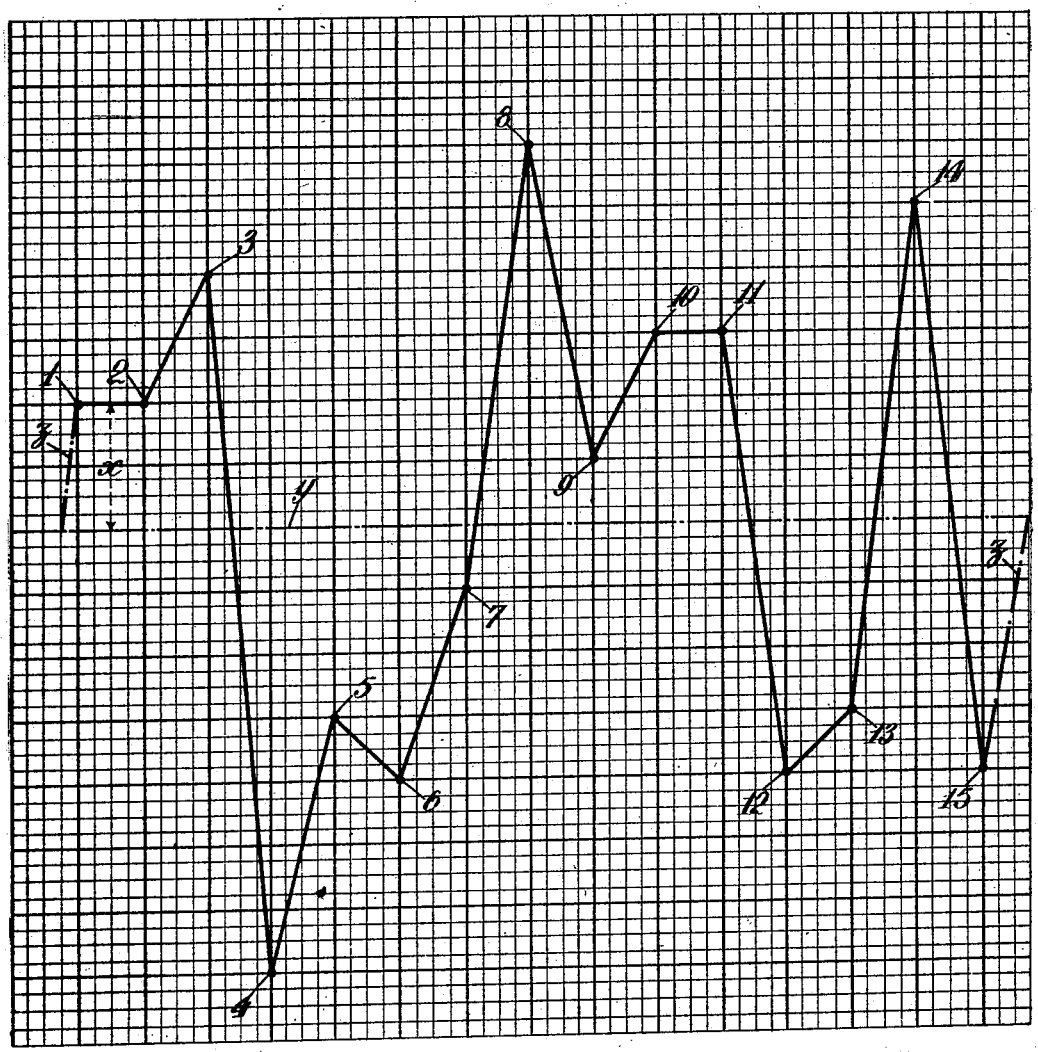

July 6, 1926.  1,591,349
A. C. WICKMAN
DEVICE FOR GAUGING OR TESTING DIMENSIONS
Filed August 13, 1923   3 Sheets-Sheet 1
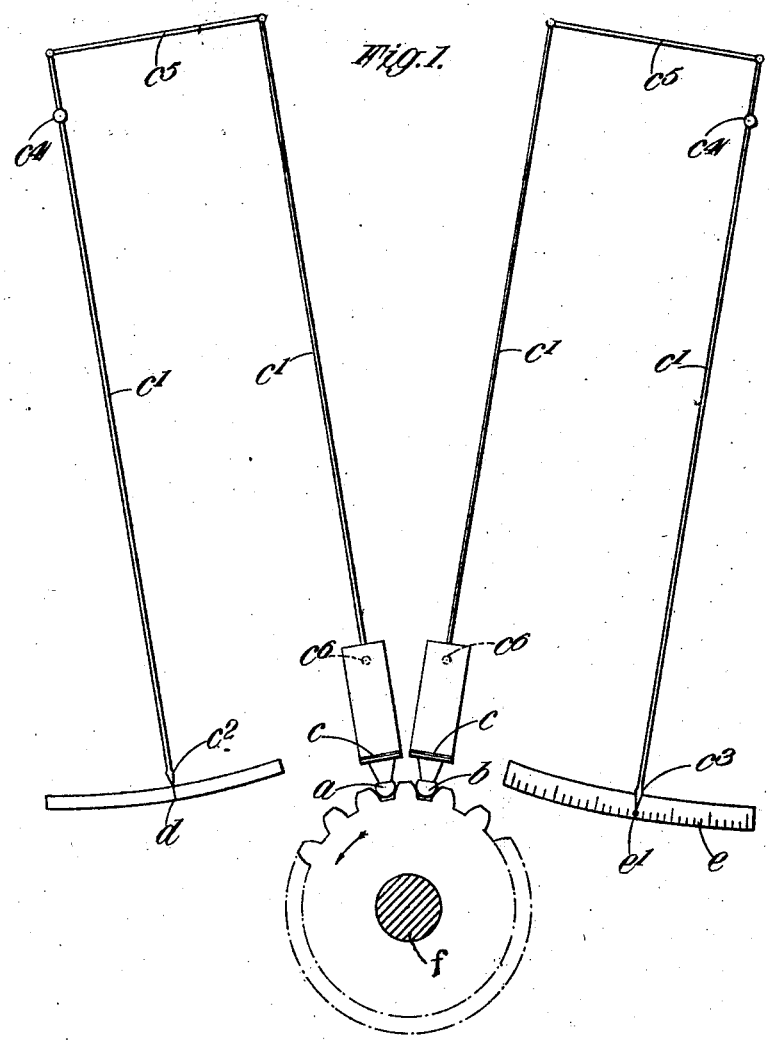
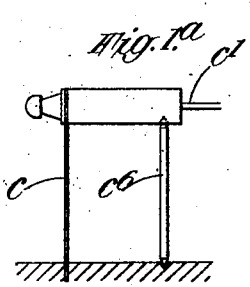
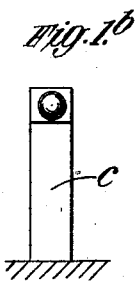

July 6, 1926.

A. C. WICKMAN 1,591,349

DEVICE FOR GAUGING OR TESTING DIMENSIONS

Filed August 13, 1923   3 Sheets-Sheet 2

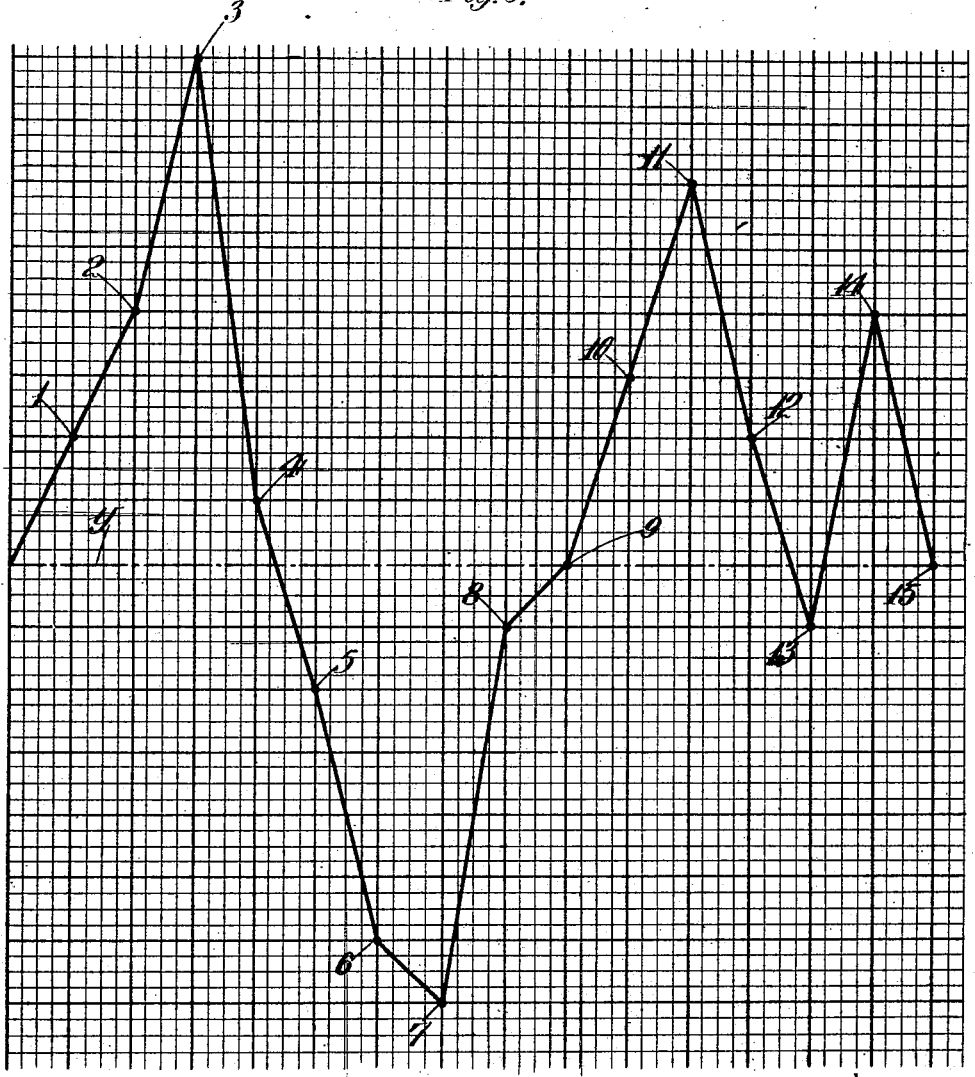

Patented July 6, 1926.

1,591,349

UNITED STATES PATENT OFFICE.

AXEL CHARLES WICKMAN, OF LEAMINGTON SPA, ENGLAND.

DEVICE FOR GAUGING OR TESTING DIMENSIONS.

Application filed August 13, 1923. Serial No. 657,226, and in Great Britain September 22, 1922.

The present invention relates to gauging or testing the accuracy of the division of an imaginary or actual circle or other endless line on or in an article into parts or divisions intended to be equal, as for instance the gauging or testing of the pitch in toothed wheels and the like and divisions of a dividing head or plate or of a scale dial or the like.

Heretofore in such gauging or testing operations there has been used a master worm wheel or a micrometer or micrometer like device in which a worm or screw thread is employed whereby the work has been turned or moved relatively to the dial or like devices by which variation in the dimension of the pitch or division has been indicated. In this way a curve has been plotted which if the master worm wheel or/and worm or screw thread or indicating devices were absolutely perfect would be the true error curve of the divisions being gauged or tested but such theoretically perfect devices cannot be produced by means heretofore known and therefore the curve referred to has never been correct, and consequently perfectly equal divisions have not been produced except perhaps by accident. The main object of the present invention is to enable the accuracy of the division to be gauged or tested by the use of methods in which the perfection of a worm wheel or worm or screw thread or the like or the accurate division of dials or scales or the like is not involved or necessary.

According to the present invention the gauging or testing of the accuracy of the division of an actual or imaginary circle or other endless line into parts or divisions intended to be equal is performed essentially by zeroizing the beginning of a division and noting the limit or termination of its dimension for purposes of comparison, zeroizing the beginning of the next division to the same zero and then ascertaining the degree of variation, if any, of the dimension of that division as compared with the dimension of the preceding division and performing this operation on each other division in succession and thus ascertaining the rate of change of error throughout the series of divisions. The true error throughout the series, if desired, may then be ascertained by calculation and the curve or diagram made by plotting. The use therefore of such a necessarily variable or unreliable zero or indication as might be afforded by a micrometer-like device in which a screw or worm wheel is employed is avoided.

A method of gauging or testing according to the present invention may be performed by the use of a locating, indicating, or detecting device whereby the beginning of each division in succession may be zeroized to the same determined zero and at the same time an indicating or detecting device is caused to indicate or used to detect the comparative variation, if any, of the dimension of that division and then the locating, indicating or detecting device is used to zeroize the beginning of the next division while the indicating or detecting device secondly referred to is used to ascertain the comparative variation, if any, of that division and so on in succession for all the divisions. The indicating or detecting device by which the comparative variation in dimension, if any, is ascertained may be such that the variations may be indicated by the user by points or marks on squared paper, card, or the like and if these points or marks be connected one with the next by lines a diagram is produced which indicates the rate of change of error. From this rate of change of error diagram, a diagram or curve of true error may be formulated by calculation.

In the case of a toothed wheel or other work such as a dividing head or plate having a number of projections or recesses the uniformity or otherwise in pitch of which is to be gauged or tested, the zeroizing device in its simplest form may consist essentially of a species of spring plunger or the like adapted to engage or to be engaged in the spaces between the teeth and so definitely locate the beginning of each division for the gauging or testing of that division as hereinbefore described. In other means according to the invention both the zeroizing device and the device by which the comparative dimension of the division may be gauged may each consist of a contact member, usually termed a "stylus" in connection with gauging or testing machines, mounted upon a resilient plate or blade and associated with a system of multiplying levers or other devices by which lateral movement of the stylus may be multiplied, the two styli being adapted to engage in adjacent recesses in the work each stylus end bearing against the sides of the two teeth at about the pitch circle. One of the said styli is used to zeroize the beginning of each division by observation of its position to a fine degree by means of its multiplying devices which may function in association with a marked zero point and this having been done the position of the other stylus relatively to the zeroizing stylus may be observed by means of its movement multiplying devices which are associated with a graduated or calibrated scale.

The manner in which the invention may be practiced is hereinafter more particularly described with reference to the accompanying diagrams in connection by way of example with a toothed wheel and by the use of two styli. Figure 1 is a diagrammatic view of the styli with their adjuncts and a portion of the toothed wheel being dealt with. Figures 1$^a$ and 1$^b$ are elevational views at right angles to each other illustrating the manner of mounting of the styli on the resilient plates or blades. Figure 2 is a diagram of the hypothetical rate of change of error in the pitch of the teeth of a toothed wheel of fifteen teeth and Figure 3 is a diagram of true error produced or plotted by calculation from the diagram Figure 2.

$a, b$ are the two styli each mounted as usual upon a resilient plate or blade $c$ anchored below the stylus and admitting of movement of the stylus against resilience in directions across its axis as well as in the direction of its axis. The styli have rounded acting extremities so shaped and of such size as to engage in the spaces between the teeth and bear against the sides of the teeth at about the pitch circle so that each stylus adjusts itself to the middle of a space or recess between two teeth, which middle may be regarded as the beginning of one division of the pitch circle and the end of another division. Each stylus is associated with a system of movement multiplying levers $c'$ $c'$. In each system one lever is rigidly connected with the stylus so as to move therewith and is jointed at its rear end to a horizontal strut or connecting member $c^5$ which at its other end is jointed to the rear end of the other lever $c'$ of the system which is pivoted at $c^4$. The lever $c'$ which moves directly with a stylus is supported by a pin pointed strut $c^6$ which although it prevents that lever $c'$ sagging does not interfere with the movement of the stylus and lever. Each stylus may be moved in directions across its axis against the torsional resilient bending of the blade $c$ and this distortion displaces the lever $c'$ immediately connected with the stylus, the lever turning on the blade as a fulcrum. The lateral movement of the stylus is multiplied many times in the movement of the rear end of the lever last referred to. This movement is communicated through the member $c^5$ to the rear end of the other lever of the system but as this lever is pivoted much nearer its rear end than to the pointer at its other end, the movement of the rear end of the lever is again more multiplied in the movement of the pointer. In each system therefore the movement of the pointer caused by lateral displacement of the stylus is very much greater than that lateral movement. This should be well understood as a single stylus mounted on a resilient blade and connected with two movement multiplying levers as described is known in the art of gauging or testing. The stylus $a$ acts as the locating device hereinbefore referred to and the free end $c^2$ of its system of multiplying levers acts in association with a fixed marked zero $d$. The other stylus $b$ acts as the indicator of comparative variation if any, in the divisions of the pitch circle and the free end $c^3$ of its system of multiplying levers acts in association with a graduated or calibrated scale $e$ having a marked zero $e'$. In dealing with the hypothetical example indicated the styli are allowed to enter two adjacent recesses in the work, their resilient mounting causing them to bear against the sides of the teeth and the work which is temporarily mounted on a rotary mandrel or spindle indicated at $f$ is adjusted until the pointer $c^2$ is at the zero $d$ and the position of the pointer $c^3$ in relation to the zero $e'$ is observed and noted. A point 1 (Figure 2) is then marked on, say, squared paper and in any convenient position as its position is not dependent on the observation referred to. The work is then turned and the styli caused to enter the recesses respectively adjacent to those in which the styli were formerly engaged, that is, the stylus $a$ then engages in the recess in which the stylus $b$ was first engaged. The work is again adjusted until the pointer $c^2$ is at zero and the position of the pointer $c^3$ in relation to its zero and its former position is observed. The squares of the squared paper are assumed to be proportionate at some convenient rate to the markings on the scale $e$ and a point 2 is marked at a distance above or below the point 1 proportionate to the distance between the first and second positions of the pointer $c^3$, the point 2 being marked above or below the point 1 according to whether the second dimension observed is greater or less than the first dimension. In the example shown the point 2 has been made on the same horizontal line as the point 1 indicating that the second dimension was found to be the same as the first. This procedure is adopted for the third, fourth and subsequent dimensions indicated by the points 3, 4—on the diagram until the last, the fifteenth, is observed and indicated by the point 15, it being understood that the position of every point except the first is located according to the position of the point previously marked and the distance on the scale $e'$ between the two positions of the pointer $c^3$. The lateral distances between the points are not material and any convenient unit may be taken for this feature of the plotting. The points are then connected by lines except that 1 and 15 are only connected to 2 and 14 respectively. For the formulation of a true error diagram it is necessary to ascertain the zero or zero line of all the points to define the value of the plus and minus ordinates. This may be done by an equation as in the rate of change of error curve of any endless or closed series of divisions the sum of the ordinates of all the points above such a zero line must equal the sum of the ordinates below. Thus if the distance from the point 1 from the zero line is $x$ in terms of the major squares then:—

$$x + x + (x+2) + (x+4) + (x+1) + (x+1) + (x+3) = (9-x) + (5-x) + (6-x) + (3-x) + (1-x) + (6-x) + (5-x) + (6-x)$$

$$7x + 11 = 41 - 8x$$
$$7x + 8x = 41 - 11$$
$$15x = 30$$
$$x = 2$$

The zero line $y$ may therefore be drawn as shown two major squares beneath the point 1 and the broken line $z$ drawn between the points 1 and 15 across the zero line part being shown on one side of the diagram and part on the other side. The true error diagram may then be plotted by integration from the rate of change of error diagram as shown in Figure 3. The diagram is commenced from a point on the zero line one major square to the left of the position to be given to point 1 the distance between the point of commencement of the diagram and point 1 representing the first dimension gauged. As the diagram Figure 2 is directly based on and plotted in accordance with the variations of the various individual dimensions compared one with the other the distance of any of the points 1, 2, 3, . . . from the zero line indicates the error in the particular dimension the termination of which is indicated by the particular point, those above the zero line being plus errors and those below being minus errors. The true error diagram to be produced must however, clearly indicate the plus or minus error at any point from any selected point in the series of dimensions and it is clear therefore that to produce such a true error diagram from a rate of change of error diagram, the error in each dimension must be added or substracted (as the case may be) to or from the error or balance of plus or minus errors at the beginning of that dimension. From the diagram Figure 2 it is observed that the first dimension has a rate of change from zero to plus two major squares, that is, the dimension is too great by the extent indicated by two major squares. The point 1 is therefore marked in Figure 3 at two major squares above the zero line. Figure 2 shows that the dimension from 1 to 2 is also in error to the same degree, therefore in Figure 3 point 2 is marked one major square to the right and two major squares above point 1. The next dimension from 2 to 3 has an error of plus four units, that is, two units more than the error of dimension 1 to 2. The point 3 in Figure 3 is therefore plus four major squares above the point 2 so locating the point 3 eight squares above the zero line. According to Figure 2 the next dimension 3 to 4 is eleven units smaller than the dimension 2 to 3 and the point 4 has an ordinate of seven units on the minus side of the zero line, that is, the dimension 3 to 4 is seven units too small. In the diagram Figure 3 therefore, the point 4 is placed seven major squares beneath the point 3 which happens to bring it one unit above the zero line in that figure. The succeeding points are located in the diagram Figure 3 on the principles described and the integration should result, if the rate of error diagram be correct, in the point 15 being on the zero line so that if this result obtains it proves correct the rate of error diagram and if not then it is known that that diagram is incorrect. The diagram of rate of change of error (Figure 2) and true error (Figure 3) are, of course, very different in form compared one with the other for the reasons that will be apparent from the foregoing, because while the points in Figure 2 only indicate the plus or minus error in the particular dimension the termination of which is indicated by the point, the location of the points in Figure 3 as compared with the zero line indicates the plus or minus error of the points from the beginning of the dimension the end of which is indicated at 1. In the hypothetical case described and illustrated, the relationship between the two diagrams may be easily realized by a simple calculation. For instance, the dimension 1 to 2 is the same as dimension zero to 1 and has the same error, namely, two units, it is obvious, therefore, that the end of dimension 2 is four units displaced on the plus side from the beginning of the dimension zero to 1 and this is shown in the diagram Figure 3. The diagram Figure 2 shows that the dimension 2 to 3 is two units greater than the dimension 1 to 2, and, therefore, is in itself four units too great, but the dimension 1 to 2 was also two units too great, as also the dimension zero to 1, consequently the point 3 is eight units displaced on the plus side from the beginning of the dimension zero to 1 and this is shown in Figure 3 where point 3 is eight units above the zero line. Then taking the dimension 3 to 4; this is shown by Figure 2 to be eleven units smaller than the dimension 2 to 3, but the dimension 2 to 3 was four units too great, therefore the dimension 3 to 4 is in itself seven units too small as indicated in Figure 2 where the point 4 is seven major squares below the zero line. As therefore point 3 is eight units on the plus side from the beginning of the dimension zero to 1, it is obvious that the minus error in the dimension 3 to 4 reduces the total error to one unit on the plus side and this is indicated by Figure 3 from which it will be observed that point 4 is one major square above the zero line. It is hardly necessary to continue with this comparison of the two diagrams and it will be realized that each point in the diagram Figure 3 is nearer to or farther from the zero line according to the total previous error or balance of preceding plus and minus errors. For instance, in Figure 3, the point 9 is actually on the zero line showing that notwithstanding the errors in the previous dimensions they compensate each other so that the end of the dimension 8 to 9 is actually in correct position, although this would not be directly apparent from Figure 2 which merely shows that the dimension 8 to 9 is five units smaller than the dimension 7 to 8 and is itself one unit too large. If the relationship of proportional movement between the pointer $c^3$ and lateral movement of the stylus $b$ be known then the diagram will indicate the actual rate of change error and true errors in the pitch respectively.

When the divisions of a graduated dial or circular scale are to be gauged or tested according to the present invention it is convenient to use two microscopes in a manner which will be understood from the foregoing description and by the known manners of use of microscopes for gauging or testing. In practising the present invention one microscope is provided with a zero hair line and the other either with a gradicule in the eye piece or a hair line adjustable by a micrometer.

The degree of multiplication provided for of the movement of the styli or the power of the microscopes is according to the degree of accuracy desired and for example by providing optical magnification of the movement of the pointers $c^2$, $c^3$ in known manner an inaccuracy of division of .000005 of an inch may be possible of detection.

The present invention is particularly valuable in the production of toothed wheels and worm wheels and the like. After the first formation of the teeth or the like the pitch thereof is gauged or tested as hereinbefore described and steps taken to remedy the errors as for instance by lapping or the like and then the work may be submitted to a second gauging or testing operation according to the invention and if found not perfect the work undergoes another correcting operation and so on until the pitch or dimensions of the divisions are found to be perfect. When the invention is used in connection with such articles as divided circular scales or dials the errors, if any, between the divisions having been ascertained according to the invention the various small errors may be taken into account in using the scale or dial, or the scale or dial may be used as a master scale or dial and perfectly divided scales or dials may be produced by taking into account the errors in the master.

In some cases it is desirable to provide means for checking the result by dealing with certain equal portions or proportions of the whole series of divisions dealt with, that is, in a series having an even number of divisions, four or other equal portions or in the case of a series having an odd number of divisions three equal portions, or some other number of equal portions into which the whole series of divisions may be divided. For instance in the case of a series of 360 divisions it may in some cases be advisable after the true error curve has been obtained to check also the 90, 180, 270 and 360 degree points as if it were a four division plate or a series of four equal divisions. This checking would obviate any slight progressive error occurring without being discovered.

In the case of toothed wheels and some other articles it is more important in connection with the desired accuracy of the divisions or pitch to ascertain the rate of change of error than the true error curve because it is the rate of change of error which causes the objectionable acceleration and the use of the present invention enables the rate of change of error diagram to be produced directly which is an advantage. For work-shop practice this rate of change of error diagram is usually sufficient but where it is desired to obtain the true error curve this may be readily made by calculation from the rate of change of error diagram or curve as hereinbefore set forth.

The invention is specially useful in connection with toothed wheels or worm wheels or division of a circular scale or dial or dividing head or plate but the invention may also be used in connection with any divisions in an endless series.

What I claim and desire to secure by Letters Patent of the United States is:—

1. A method of gauging or testing accuracy of the division of an imaginary or actual circle of other endless line on or in an article into parts or divisions intended to be equal consisting essentially in zeroizing the beginning of a division and noting the limit or termination of its dimension for purposes of comparison, zeroizing the beginning of the next succeeding division to the same zero and then ascertaining the degree of variation, if any, of the dimension of that division as compared with the dimension of the preceding division and performing this operation on each of the other divisions in succession and thus ascertaining the rate of change of error throughout the series of divisions.

2. A method of gauging or testing accuracy of the division of an imaginary or actual circle or other endless line on or in an article into parts or divisions intended to be equal consisting essentially in zeroizing the beginning of a division and noting the limit or termination of its dimension for purposes of comparison, zeroizing the beginning of the next succeeding division to the same zero and then ascertaining the degree of variation, if any, of the dimension of that division as compared with the dimension of the preceding division and performing this operation on each of the other divisions in succession and thus ascertaining the rate of change of error throughout the series of divisions, and then ascertaining the true error throughout the series from the data of the rate of change of error.

3. A method of gauging or testing accuracy of the division of an imaginary or actual circle or other endless line on or in an article into parts or divisions intended to be equal consisting essentially in zeroizing the beginning of a division and noting the limit or termination of its dimension for purposes of comparison, zeroizing the beginning of the next succeeding division to the same zero and then noting the degree of variation, if any, in the dimension of that division as compared with the dimension of the preceding division and performing this operation on each of the other divisions in succession recording the results of comparison by recording indications in relative positions according to the variations in dimensions ascertained and obtaining the location for the zero line of said indications by equating the sums of the ordinates algebraically calculated above and below the zero line.

4. A method of gauging or testing accuracy of the division of an imaginary or actual circle or other endless line on or in an article into parts or divisions intended to be equal consisting essentially in zeroizing the beginning of a division and noting the limit or termination of its dimension for purposes of comparison, zeroizing the beginning of the next succeeding division to the same zero and then noting the degree of variation, if any, in the dimension of that division as compared with the dimension of the preceding division and performing this operation on each of the other divisions in succession recording the results of comparison by recording indications in relative positions according to the variations in dimensions ascertained, obtaining the location for the zero line of said indications by equating the sums of the ordinates algebraically calculated above and below the zero line and then obtaining an indication or diagram of the true error from the recorded indications of the rate of change of error and the ascertained location for the zero line aforesaid.

5. A method of gauging or testing the uniformity in pitch throughout an endless or closed series of recesses in an article, consisting essentially in zeroizing the beginning of a pitch by the use of a contact member which is caused to locate in one of the said recesses and make contact with both sides thereof and noting the limit or termination of that pitch for purposes of comparison by the use of another contact member which is caused to locate in the next recess and make contact with both sides thereof, zeroizing the beginning of the next succeeding pitch by causing the first mentioned contact member to locate in the last mentioned recess and ascertaining the degree of variation, if any, of the pitch as compared with the preceding pitch by causing the second mentioned contact member to locate in the next recess and performing this operation on each other pitch in succession and thus ascertain the rate of change of error in the pitch throughout the series of recesses.

6. An instrument or apparatus for use in gauging or testing the uniformity in the pitch of an endless or closed series of recesses or projections in or on an article, comprising in combination a member displaceable to and from the work to engage the work at each side of one recess or projection to zeroize it, another member displaceable to and from the work to engage the work at the same time at each side of another recess or projection and laterally displaceable to and from the first mentioned member, and a device to indicate in a multiplied manner variations in its distance from the first mentioned member.

7. An instrument or apparatus for use in gauging or testing the uniformity in the pitch of an endless or closed series of recesses in or on an article, comprising in combination two contact members for engaging in the recesses in succession and capable of displacement to and from the work, one of said contact members being for use in zeroizing the beginning of each pitch and the other contact member being laterally displaceable to and from the first mentioned contact member, each of said members making contact with opposite sides of a recess and a device to indicate in a multiplied manner any variation in its distance from the first mentioned contact member and thus disclose any variation in the dimension of a pitch as compared with another.

8. An instrument or apparatus for use in gauging or testing the uniformity in the pitch of an endless or closed series of recesses in or on an article, comprising the combination of means to support the article and admit of its rotation, two contact members for engaging in said recesses in succession, two resilient plates or blades each carrying one of the said contact members and admitting of displacement of each member to or from the work and also lateral displacement of their extremities relatively to each other, and a device to indicate in a multiplied manner any variation in the distance between the said members.

AXEL CHARLES WICKMAN.